United States Patent
Reilly et al.

[11] 3,998,331
[45] Dec. 21, 1976

[54] METHOD AND APPARATUS FOR HANDLING AND TRIMMING BLOW MOLDED ARTICLES

[75] Inventors: Joseph R. Reilly, Naugatuck; Lars G. Schon, Bloomfield, both of Conn.

[73] Assignee: Monsanto Company, St. Louis, Mo.

[22] Filed: Feb. 18, 1975

[21] Appl. No.: 550,537

Related U.S. Application Data

[62] Division of Ser. No. 467,378, May 6, 1974, Pat. No. 3,894,454.

[52] U.S. Cl. .................... 209/111.5; 209/74 R; 198/489; 198/475
[51] Int. Cl.² ........................................ B07C 5/34
[58] Field of Search ............. 198/22 R, 22 B, 137, 198/138, 262, 276, 277, 282, 283, 288, 213, 38, 31 AB, 31 AC, 107; 209/73, 74, 111.5

[56] References Cited

UNITED STATES PATENTS

| | | | |
|---|---|---|---|
| 2,604,200 | 7/1952 | Hohl et al. ........................ | 198/282 |
| 2,961,094 | 11/1960 | Bentley ........................ | 198/31 AC |
| 3,101,848 | 8/1963 | Uhlig ........................ | 198/31 AC |
| 3,586,168 | 6/1971 | Osheff et al. .................... | 209/111.5 |
| 3,710,937 | 1/1973 | Cook ............................. | 209/74 R |
| 3,856,131 | 12/1974 | Flamand et al. .................... | 198/26 |
| 3,880,586 | 4/1975 | Murayama et al. ............ | 209/111.5 |

FOREIGN PATENTS OR APPLICATIONS

| | | | |
|---|---|---|---|
| 794,253 | 4/1958 | United Kingdom .............. | 198/213 |

*Primary Examiner*—Evon C. Blunk
*Assistant Examiner*—Joseph E. Valenza
*Attorney, Agent, or Firm*—Michael J. Murphy

[57] ABSTRACT

In apparatus for handling molded plastic articles, some of which are to be segregated, the improvement comprising a rotatable screw conveyor and adjacent, opposite support bar forming a path for the articles between them, such bar having a retractable portion to allow articles to either move out of or proceed along the path depending on the position of the retractable portion, and a reciprocable plunger operable with the retractable portion on receipt of a suitable control signal generated by a temperature sensing controller upstream of the retractable portion.

3 Claims, 3 Drawing Figures

METHOD AND APPARATUS FOR HANDLING AND TRIMMING BLOW MOLDED ARTICLES

CROSS REFERENCES TO RELATED APPLICATIONS

This is a division of application Ser. No. 467,378, filed May 6, 1974 now U.S. Pat. No. 3,894,454.

Ser. No. 336,023, filed Feb. 26, 1973, now U.S. Pat. No. 3,873,660; Ser. No. 418,075, filed Nov. 20, 1973, now U.S. Pat. No. 3,894,835; Ser. No. 424,866, filed Dec. 14, 1973, now U.S. Pat. No. 3,880,301.

BACKGROUND OF THE INVENTION

This invention relates to deflashing articles and more particularly to apparatus for handling and segregating blow molded thermoplastic preforms wherein the thermoplastic is at elevated temperature.

U.S. Pat. No. 3,754,841 discloses forming molecularly oriented containers from blow molded preforms which have been initially shaped from a portion of an extruded hollow parison. In such system it is desirable to retain in the plastic a major part of the heat which was generated during extrusion in order that such heat can be used to provide the temperature which is necessary to produce molecular orientation and allow reshaping of the preform into a finished article in the final blow mold. Therefore, as disclosed in such patent, the preforms are ejected from the mold cavities at an overall average temperature through the wall thickness which is greater than that usually encountered in conventional blow molding where further working is not contemplated and the plastic is usually cooled to the maximum extent while in the cavity in order that it be as rigid as possible on ejection from the mold.

Inherent in practically all blow molded parts formed from a freely extruded parison is the presence of an integral neck moil which represents a short unused part of the parison length extending beyond one end of the blow mold cavity which must be removed before the article can be considered to be in final form. A "tail" portion is also formed along a thin web joint at the opposite end but this is usually broken off without much difficulty and is not of concern herein. The neck moil in the system of the aforesaid patent is desirably removed before final blowing while the plastic in the region of the integrally attached moil is at elevated temperature, since under such conditions it is more pliant than if at lower temperatures when it is quite rigid and more difficult to work. A device for sectioning articles generally found operable in this environment is typically disclosed in U.S. Pat. Nos. 3,406,598 and 3,429,211 and involves the use of a cutting blade penetrating into the object being sectioned at the desired level as it is moved across the blade between fixed and movable guides.

Sectioning articles while at elevated temperature is, however, not without problems. If the plastic is too hot it tends to stretch across the blade without any meaningful penetration through the wall at all, whereas if too low in temperature, in addition to generating wear on the cutting member, the plastic tends to crack, especially if it is brittle and has not been toughened via molecular orientation techniques. When the articles being trimmed are the aforementioned tubular preforms having body portions also at elevated temperature which have been molded with an accurate wall distribution pattern and contour related to that desired in the later formed containers, it is important to avoid or minimize contacting the plastic which will in fact form any part of the finished container prior to final molding since the plastic is hot, will readily deform to the touch and will tend to stick to an adjacent preform should it happen to strike against one during processing in a production line. Also, when such preforms are to be temperature-conditioned in an intermediate station before reshaping, it is highly desirable that they exit the neck moil trimming or deflashing station physically oriented in an attitude which will facilitate passage through such subsequent temperature-conditioning station.

SUMMARY OF THE INVENTION

Accordingly, it is a principal object of this invention to provide improvements in apparatus for handling molded articles, some of which are to be segregated.

Other objects of this invention will in part be obvious and will in part appear hereinafter from the description which follows when taken in conjunction with the accompanying drawings.

These and other objects are accomplished in apparatus for handling and segregating molded plastic articles by providing the improvement comprising a rotatably mounted elongated screw conveyor and adjacent, segmented support bar substantially aligned opposite the conveyor forming a path for the articles between them, means for rotating the screw conveyor to advance articles along the path and means for reciprocating the segment portion into and out of alignment with the remainder of the bar to allow articles to either move out of or proceed along the path depending on the position of the segmented portion.

BRIEF DESCRIPTION OF THE DRAWINGS

In describing the overall invention, reference will be made to the accompanying drawings wherein.

DETAILED DESCRIPTION OF THE ILLUSTRATED EMBODIMENT

Figure 1:
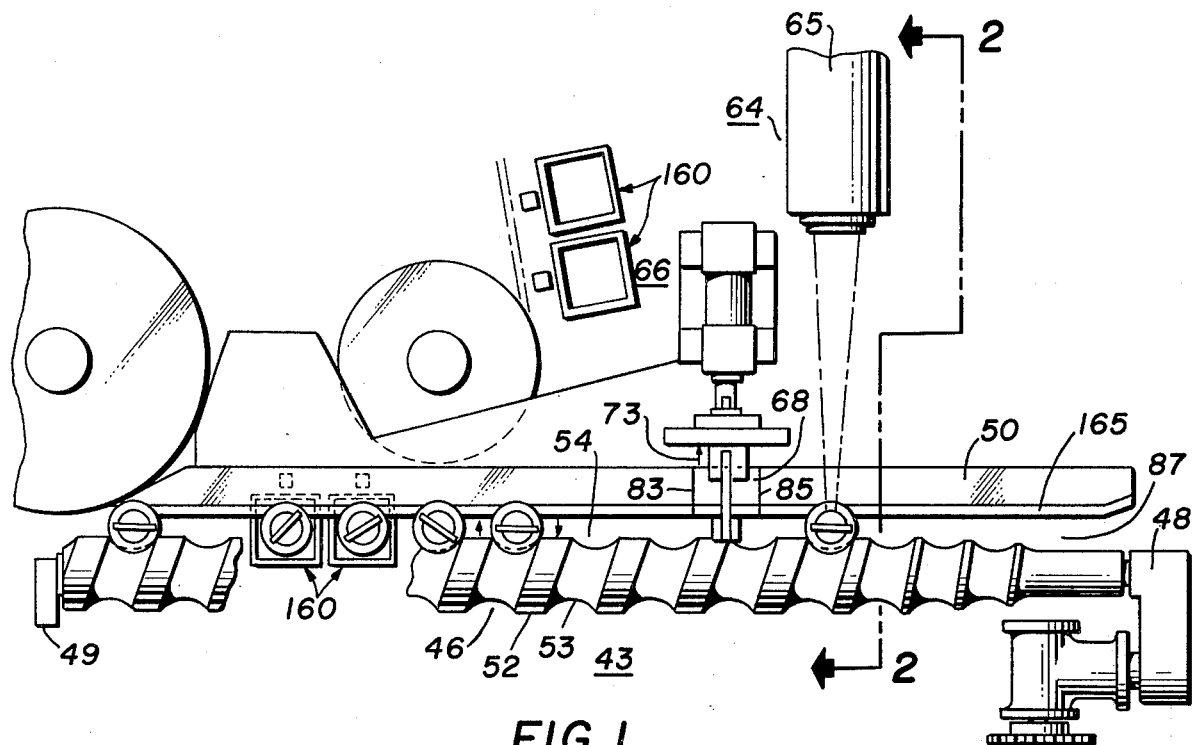
FIG. 1 is a plan view of an apparatus portion embodying the invention.
Figure 2:
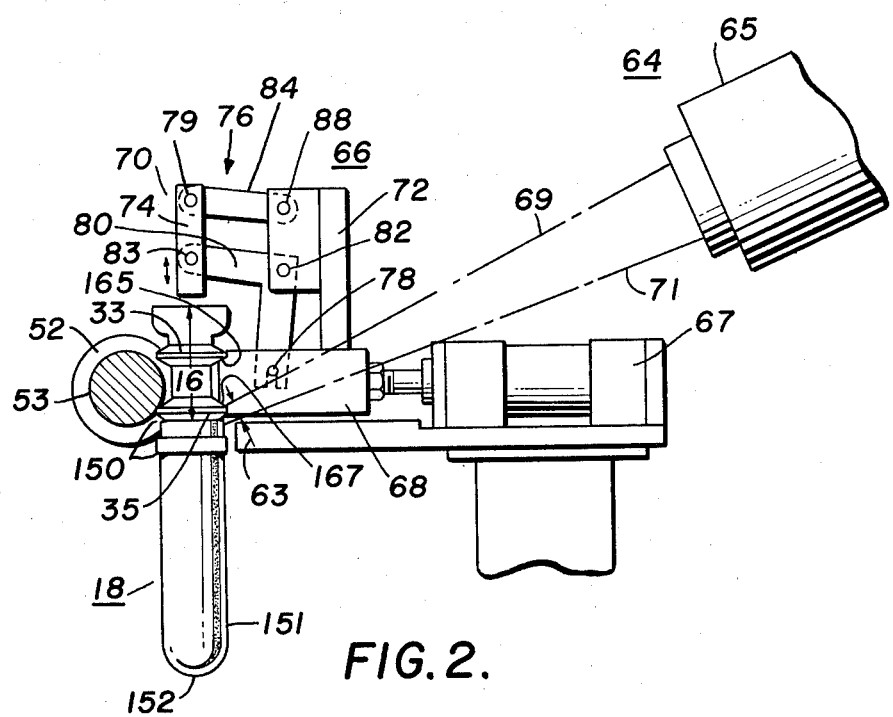
FIG. 2 is a sectional elevational view along 2—2 of FIG. 1.
Figure 3:
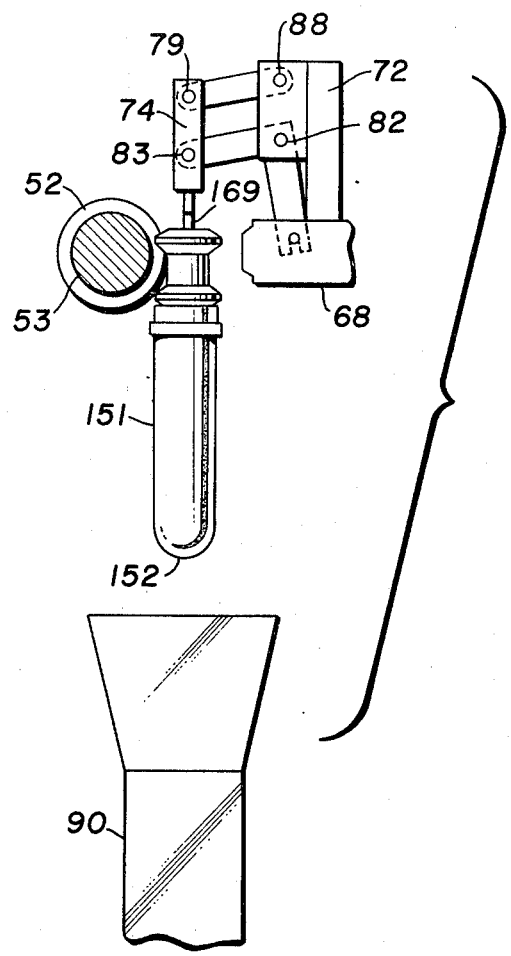
FIG. 3 is a partial, schematic, elevational view of the apparatus of FIG. 2 in its article-reject position.

Referring now to the drawings, delivery means, generally indicated as 43 in FIG. 1, comprise elongated screw 46 rotatably mounted in conventional manner via suitable gears and bearings in box 48 and support 49, and adjacent support or restraining bar 50 forming pockets 54 with the turns or flight portions 52 of screw conveyor 46. Root portion 53 of conveyor 46 is preferably contoured as illustrated in FIG. 2 to snugly fit between the spaced flared portions 33 and 35 of neck moil 16. Each article 18 is supported at its flash or moil portion 16 in a distinct pocket 54 as it is urged forwardly while rotating about its vertical axis by flights 52 in a spaced, seriatim pattern toward a downstream deflashing station located at the left end of screw 46 with respect to FIG. 1.

Temperature sensing control means, generally indicated as 64 (FIGS. 1 and 2), are close to yet upstream of article reject means 66 (FIG. 1) and function to successively measure the temperature of the thermoplastic material of articles 18 being advanced forward by screw conveyor delivery means 43 in the particular region 63 of the joint between flash portion 16 and the rest of article 18, and for generating a control signal when such measured temperature is outside a predetermined range which has been preset into the instrument. Means 64 in the illustrated embodiment includes a sensor, not shown, within housing 65 which is spaced from and out of physical contact with articles 18 for determining the temperature in region 63 by measuring the radiant energy of the plastic emanating from such region. The Williamson Model 4000S infrared thermometer system available from Williamson Corp., 1152 Main St., Concord, Mass. 01742 has been employed successfully in this application. Basically, when the radiant energy emanating from region 63 and measured by the sensor in housing 65 is such as to indicate the temperature is within the desired predetermined range, no control signal is generated, whereas when the energy is such that the temperature is outside such range, the energy is converted into an electrical control signal imposed via conventional circuitry on the coil of a solenoid valve, not shown, mounted in a pressurized air line to fluid motor 67 in FIG. 2. Suitable conventional supports, not shown, may be provided for adjusting the unobstructed line of sight (within window 69–71 in FIG. 2) of the instrument system.

Article reject means, generally indicated as 66 in FIGS. 1 and 2, are operatively situated just beyond temperature sensing control means 64 and function to eject articles in response to the previously mentioned control signal. In the illustrated embodiment, reject means 66 includes segmented portion 68 separately formed from the remainder of support bar 50 as indicated at 83 and 85 in FIG. 1, which is mounted for retraction away from the path of the articles in the direction of arrow 73. Reject means 66 may include hammer means generally indicated in FIG. 2 as 70 for forcibly urging articles 18 out of the path of their delivery to the next down-stream station on rearward actuation of retractable section 68 away from support bar 50. Hammer means 70 comprises upright bracket 72, reciprocable plunger 74 above the lateral space (FIG. 1) or delivery path between screw conveyor 46 and retractable section 68, and link means 76 pivoted to retractable section 68, to plunger 74 and to bracket 72 for imparting vertical reciprocable movement to plunger 74 as a result of horizontal movement of retractable section 68 via means such as fluid motor 67 actuated conventionally from a suitable source of pressure, not shown. Link means 76 includes L-shaped drive link 80 pivoted at 82 to bracket 72, at 78 to retractable section 68 and at 83 to plunger 74, plus driven link 84 above L-shaped link 80 which is pivoted at 79 to plunger 74 and at 88 to bracket 72. Reject means 66 further may include an ejected article discharge chute 90 (FIG. 6) substantially coaxially aligned beneath plunger 74 for receiving articles 18 for reclaim which are out-of-temperature specification in region 63.

Support means for individual articles 18 after removal of a moil portion 16 are generally indicated in FIG. 1 as 160 and are arranged to linearly move substantially coaxially beneath each article as it approaches and passes through the deflashing station. The space between a pair of immediately adjacent carrier assemblies 160 is equal to that between adjacent preforms 18 and to the pitch of the flights 52 of screw conveyor 46.

In operation, articles such as untrimmed preforms 18 made of thermoplastic material and which comprise finish portion 150 (FIG. 2) immediately beneath neck moil 16 and integral, elongated body portion 151 having rounded bottom end 152 are provided to the system having just been blow molded in an upstream station, for example in the manner generally described in U.S. Pat. No. 3,754,851. The thickness of the wall in region 63, and more specifically at the uppermost surface of finish 150 after removal of moil 16, will vary in accordance with the size of the portion of the finished article which it will eventually form, but generally is between 50 and 250 mils. Though the thermoplastic material may vary, particularly preferred materials which perform well in the present process are those which are structurally amorphous in nature, having a relatively high glass transition temperature range between about 180° to 270° F., being relatively brittle in nature below such glass transition temperature range, especially at normal ambient temperature conditions. Examples of such materials are those wherein a major component of the polymer (at least fifty weight percent) has been polymerized from a monomer selected from the group consisting of acrylonitrile, methacrylonitrile and mixtures thereof. Any suitable comonomer(s) well known to those skilled in the art, such as styrene, which is copolymerizable with such nitrile-based materials may be used. In terms of the process of this invention, in the as-supplied condition immediately after ejection from the blow mold cavity, the plastic in region 63 of attachment of moil portion 16 to finish 150 has a cool outer skin, on the order of about 10 to 20 percent of the total thickness, which is at a temperature approaching the surface temperature of the cavity of the blow mold in which it was formed, and an inner wall, comprising the remainder of the thickness beneath the cool outer skin, which is at a temperature between the skin temperature and the temperature of the plastic in the extruder head where the hollow parison is formed from which preform 18 is blown. Such surface temperature of the blow mold cavity of course will vary, usually with the temperature of the particular mold cooling medium being used, but when water is used for mold cooling this temperature is usually about 35° to 90° F., whereas the extrusion temperature of the plastic is well above the temperature at which substantial molecular orientation occurs on stretching and represents that temperature at which the plastic is molten. For the previously mentioned high nitrile based materials, such extrusion temperature has been found most recently to be within the range of 450° to 520° F.

Preforms 18 are deposited at the inlet end 87 of means 43 between screw conveyor 46 and support bar 50 by any suitable means such as another conveyor along which they are well spaced or even by carefully inserting them manually between such members. The untrimmed preforms thus supported only on their relatively hot moil portions 16 are sequentially advanced in the manner generally illustrated in FIGS. 1 and 2 while rotating about their vertical axes as a result of frictional rolling contact with flights 52 and bar 50. Support by bar 50 (FIG. 2) is accomplished by having upper and lower flared portions 33, 35 of moil 16 seat in the pair of elongated notches 165, 167 extending along the full length of bar 50. As can be appreciated, the pockets 54 formed between adjacent portions of the screw conveyor flight and opposing surface portions of support bar 50 positively restrain adjacent preforms from touching each other during such sequential, rotating advancement. Thus the plastic of body portion 151 of each preform is isolated from the next adjacent one, and any deformation of the hot, moldable plastic, or sticking together of adjacent units, which might otherwise occur without such separation, for example when one strikes against another, is prevented. The plastic of each article 18 as it passes through the present process can be considered due to its temperature to be lacking in shape-restitution properties if deformed in any way, and this is why such separation is important.

During this sequential advancement, the plastic at least in region 63 is allowed to partially equilibrate in temperature through the thickness of the wall. In other words, the outside skin temperature increases while the inside portion of the wall decreases over that existing on ejection of the part from the blow mold. The temperature in region 63 at this point in the process when trimming is about to take place is quite important, because as mentioned previously, when the plastic is too cool and brittle (e.g. the high nitrile materials) cracking will occur in the area of finish 150 adjacent the trim line, whereas if it is too soft as a result of too high a temperature, the plastic will stretch over sharp cutting edge and pass through the deflashing station without full, effective removal of the moil portion. In characterizing the desired temperature in region 63 for a level of stiffness in the plastic adequate for effective trimming without cracking the plastic, the average overall temperature through the wall should be greater than the glass transition temperature of the thermoplastic material but not excessively so. Such desired average overall temperature through the wall when characterized with reference to the more conveniently measured actual skin or surface temperature has been found with respect to such surface temperature to lie within the range of about 70° F. less than to about 30° F. greater than the glass transition temperature of the plastic. Such range for high nitrile-based thermoplastic materials is from about 160° to 260° F.

Allowing the temperature of the plastic to partially equilibrate through the wall to provide a temperature pattern different from that existing on ejection from the mold is important because of the manner in which temperature varies with the length of time out of the blow mold. For example, on ejection from the mold, the outer skin temperature has been found to initially increase rather rapidly via conduction from the hotter inside temperature, so that a surface temperature conducive to effective penetration by a cutting edge exists for a rather short interval of only a few seconds, and to trim adjacent the mold at exactly the right time under such circumstances would be rather intractable. On the other hand, the surface temperature does reach a maximum and then decreases rather gradually as equilibration through the wall continues with time as heat is lost to the surroundings, such that in coming down in temperature, the plastic is within a range conductive to effective trimming for a substantially longer period that that covering the period when the surface is rising in temperature to its maximum. For this reason, partial equilibration in temperature through the wall is important, complete equilibration for brittle materials giving a temperature which causes undesirable cracking on sectioning.

As the rotating preforms advance toward the trimming, region 63 thereof passes across the temperature sensing window 69, 71 of temperature sensing control means 64, upstream of article reject means 66. At such location, means 64 measures the surface temperature in region 63 and, in the manner previously described, determines whether such measured temperature is within the previously mentioned range of 70° F. less than to 30° F. greater than the glass transition temperature of the plastic. If such measured temperature is within this range, the article continues uninterrupted, whereas if it is not, temperature-responsive generation of a control signal occurs which is sent to a solenoid valve in a pneumatic air supply line to fluid motor 67 which is mechanically coupled to retractable portion 68 of support bar 50. Such signal causes the piston in the actuator 67 to reciprocate horizontally to the right in FIG. 2, thus momentarily moving segmented portion 68 out of alignment with the rest of bar 50 and therefore out of engagement with flared portion 33, 35 of the moil of that particular article, in order to allow the thus incompletely supported preform to fall by gravity out of the path of advancement toward the deflashing station into chute 90 (FIG. 6) below. When hammer means 66 are used, and which find particular utility in a high speed manufacturing operation wherein the time for something to fall by gravity out of the path of advancement is excessive with respect to the rate at which the articles are being processed, plunger 74 forcibly pushes down on the closed top 169 of the incompletely supported preform as illustrated in FIG. 6, to accelerate its ejection out of the path. Such closed top, of course, is optional and by suitably designing the striking surface of plunger 74, alternative top configurations could be employed.

Though it is possible to promote temperature equilibration in the plastic in region 63 to the desired level via exposure to ambient temperature surroundings (on the order of 70° F.), this can be accelerated by affirmatively removing heat from the outer surface as it is conductively transferred thereto from the hotter plastic of the inner wall section, for example, by contacting such outer surface with a suitable conventional external liquid fluid heat transfer medium.

The above description and particularly the drawings are set forth for purposes of illustration only and are not to be taken in a limited sense. Various modifications and alterations will be readily suggested to persons skilled in the art. It is intended, therefore, that the foregoing be considered as exemplary only and that the scope of the invention be ascertained from the following claims.

What is claimed is:

1. In apparatus for handling and segregating molded plastic articles at elevated temperature having contoured moil portions adjacent one end, the improvement comprising:
    A. a rotary mounted elongated screw conveyor and adjacent, segmented support bar substantially aligned opposite said conveyor forming a path for said articles between them, said segmented portion of the support bar and contoured moil portions having cooperating complementary projections for supportive engagement during traversal of such path, said screw conveyor having a root portion contoured to snugly cooperate with said contoured moil portions such that the screw conveyor and complementary portion of the bar form the sole support for the articles as they proceed along the path;
    B. means for rotating said screw conveyor to advance articles along said path;

C. means for reciprocating the segmented portion into and out of alignment with the remainder of said bar to allow articles to either move out of or proceed along said path depending on the position of said segmented portion; and
D. temperature sensing control means upstream of the segmented support bar for measuring the temperature in the region of the joint between the moil portions and the rest of the articles and generating a signal to the means for reciprocating the segmented portion when such temperature is outside a predetermined range; and E. hammer means adjacent the segmented portion for forcibly urging articles out of the path on reciprocation of the segmented portion out of alignment with the remainder of the bar.

2. The apparatus of claim 1 including a chute for ejected articles generally below the segmented supported bar.

3. The apparatus of claim 1 wherein the contoured moil portions are vertically spaced and outwardly flaring and the complementary portions of the segmented bar comprise elongated notches.

* * * * *